United States Patent [19]

Thomas et al.

[11] 4,422,165
[45] Dec. 20, 1983

[54] MAXIMUM LIKELIHOOD ESTIMATION OF THE RATIO OF THE VELOCITIES OF COMPRESSIONAL AND SHEAR WAVES

[75] Inventors: Stephen W. Thomas, DeSoto, Tex.; Robert M. Otis, Littleton, Colo.

[73] Assignee: Mobil Oil Corporation, New York, N.Y.

[21] Appl. No.: 233,541

[22] Filed: Feb. 11, 1981

[51] Int. Cl.[3] ............................................. G01V 1/36
[52] U.S. Cl. ..................................... 367/40; 367/75; 364/421
[58] Field of Search ........................... 367/31, 40, 75; 364/421, 422, 728

[56] References Cited

U.S. PATENT DOCUMENTS

| 3,003,577 | 10/1961 | Itria ........................................ 367/75 |
| 3,514,585 | 5/1970 | Horsworthy .......................... 367/40 |
| 3,571,788 | 3/1971 | Bachus et al. ........................ 367/40 |
| 3,629,800 | 12/1971 | Schneider ............................. 367/40 |
| 4,203,161 | 5/1980 | Johnson et al. ...................... 367/40 |
| 4,241,429 | 12/1980 | Bloomquist et al. ................. 364/421 |
| 4,244,026 | 1/1981 | Dickey ................................. 364/728 |

FOREIGN PATENT DOCUMENTS

| 2312784 | 5/1975 | France ................................. 367/75 |
| 1379460 | 1/1975 | United Kingdom ................ 364/421 |
| 146512 | 8/1962 | U.S.S.R. .............................. 367/40 |

OTHER PUBLICATIONS

Nations, "Lithology . . . Wave Transit Time Relationships", 6/5/74, pp. 3–8, 15th Annu. Logg. Symp. of SPWLA, Texas.

Primary Examiner—Nelson Moskowitz
Attorney, Agent, or Firm—Charles A. Huggett; Michael G. Gilman; George W. Hager

[57] ABSTRACT

Maximum likelihood estimation theory is applied to the determination of the ratio of P-wave velocity to S-wave velocity ($V_p/V_s$) from P-wave and S-wave seismic sections obtained along the same line of exploration. For a certain statistical model, the optimal estimator for $V_p/V_s$ is determined, and shown to be equivalent to maximizing the simple mathematical correlation between P-wave and stretched S-wave seismogram segments. The maximum likelihood method provides a data-dependent formula for the mean square error associated with the $V_p/V_s$ estimate. Alternatively, the latter formula provides a measure of the $V_p/V_s$ information contained in the data. The information measure also provides optimal weighting for computing multitrace $V_p/V_s$ averages, and provides for the determination of the statistical error in such averages. The performance of the maximum likelihood estimator and its attendant information measure are demonstrated on synthetic and real seismograms.

10 Claims, 9 Drawing Figures

P-WAVE        S-WAVE

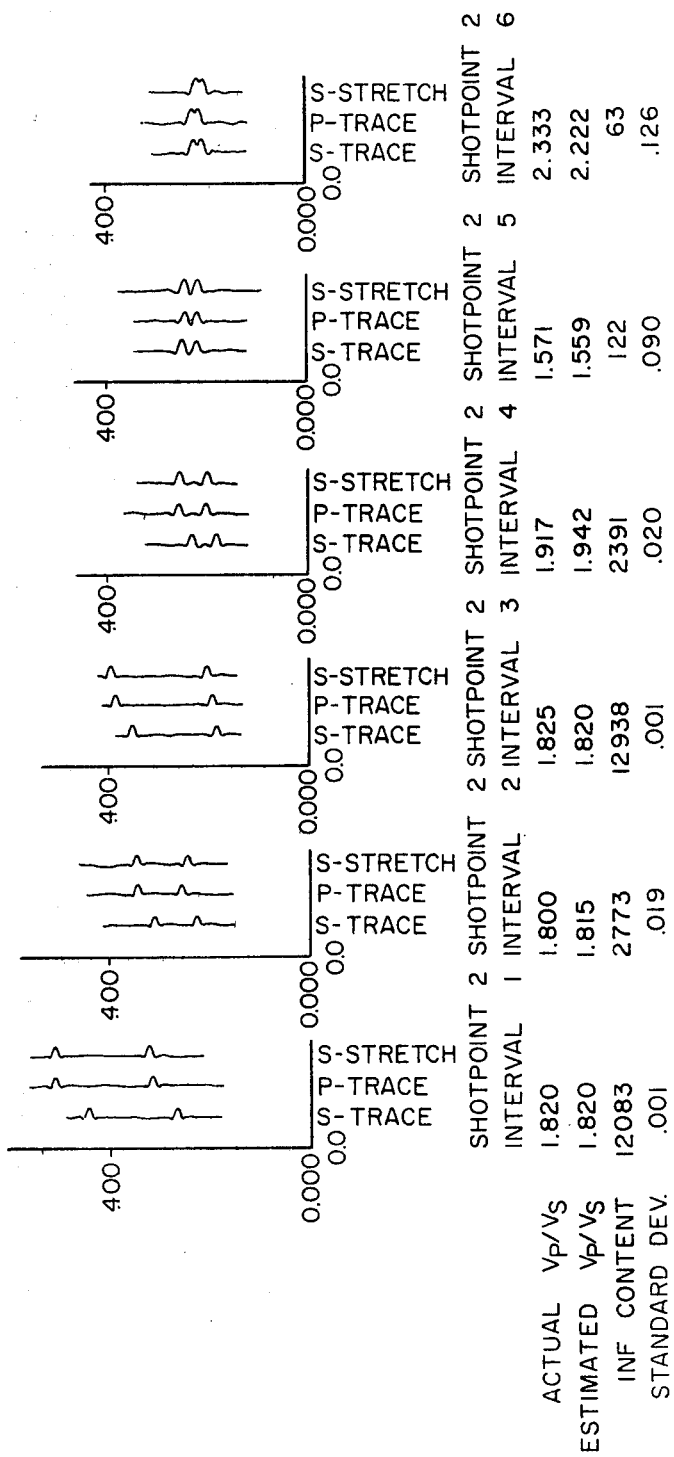
FIG. 5  MODEL STUDY RESULTS, NO NOISE

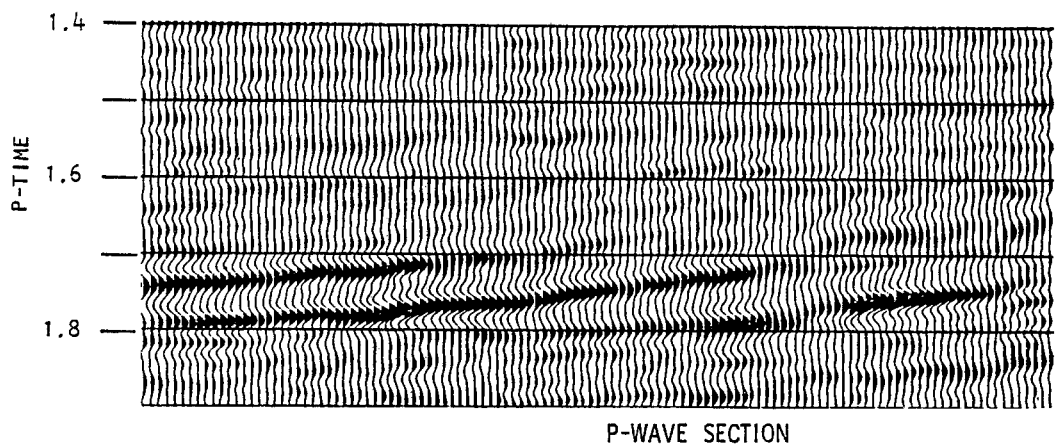
FIG. 6 a — P-WAVE SECTION
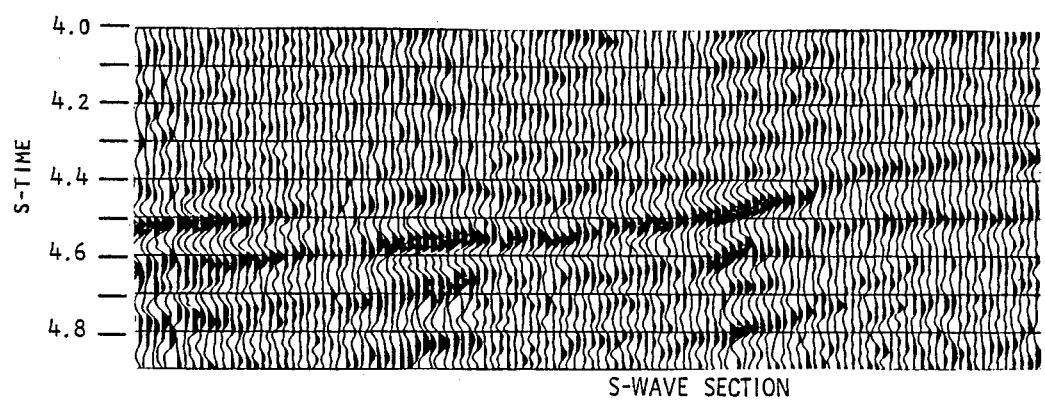
FIG. 6 b — S-WAVE SECTION
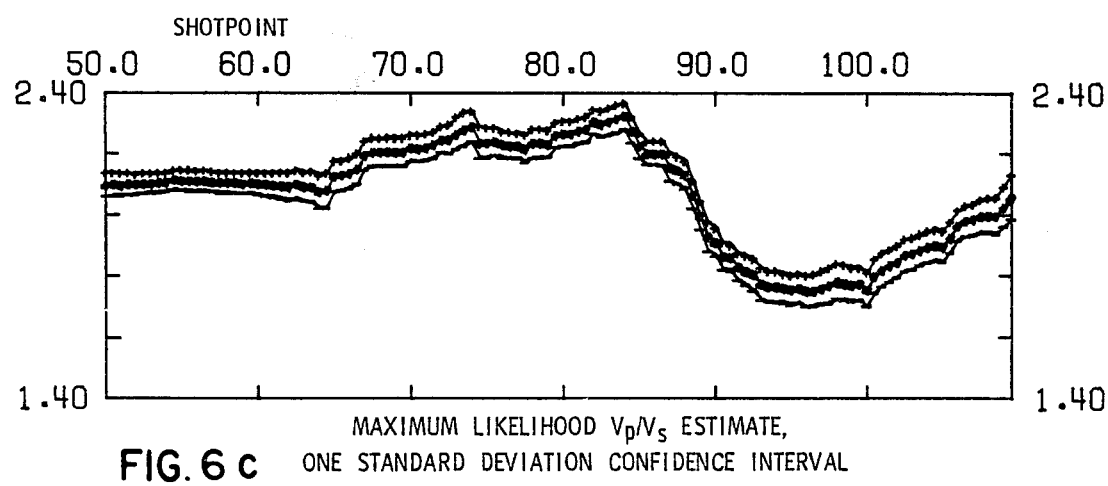
FIG. 6 c — MAXIMUM LIKELIHOOD $V_p/V_s$ ESTIMATE, ONE STANDARD DEVIATION CONFIDENCE INTERVAL

MAXIMUM LIKELIHOOD ESTIMATION OF THE RATIO OF THE VELOCITIES OF COMPRESSIONAL AND SHEAR WAVES

FIELD OF THE INVENTION

This invention relates broadly to the field of geophysical exploration; more particularly, the invention relates to a method for obtaining an estimate of the ratio between the velocities of compressional and shear waves propagating through layers of rock in the earth. This ratio is of use in identifying the nature of the rock present in these subterranean layers.

BACKGROUND OF THE INVENTION

It has been known for many years that elastic waves in a solid propagate according to several modes. One mode of propagation of elastic waves is a compressional wave, or "P-wave", in which particle motion within the solid is in a direction perpendicular to the wavefront. In another mode, the shear or "S-wave" mode, the particle motion within the solid is parallel to the wavefront. Compressional and shear waves travel at different velocities in a given solid and the ratio of these velocities, $V_p/V_s$, is a function of and hence indicative of the material in which the waves are propagating.

More recently, it has been found that in the field of seismic exploration in the search for oil, gas and other valuable minerals that the ratio of the velocities of the P-waves and the S-waves in a subterranean layer of rock is indicative of the composition of that rock and that if sufficiently accurate measurements of the ratio $V_p/V_s$ are available to the geophysicist, he is in some cases able to predict the nature of the rock in a given subterranean layer. Since some rocks are more likely to contain these valuable minerals than others, the $V_p/V_s$ ratio is therefore a tool in the search for oil and gas. See, Gregory, A. R., "Fluid Saturation Effects on Dynamic Elastic Properties of Sedimentary Rocks", *Geophysics*, Volume 41, Number 5, pages 895–921, October, 1976; Pickett, G. R., "Acoustic Character Logs and Their Application to Formation Evaluation", *Journal of Petroleum Technology*, June, 1963.

For many years, seismic exploration has been performed by generating an acoustic wave at or near the surface of the earth and detecting its reflection and retransmission to the earth's surface by one or more geophones also located at or near the earth's surface. Measurement of the travel time between emission and detection is indicative of the depth of the interface between layers of rock from which the wave is reflected; if enough such measurements are made, they can be used to generate a display indicative of subterranean structure, lithology and fluid content. Several techniques are used to generate the acoustic energy. A method which has proven increasingly useful in recent years is the "Vibroseis" technique in which a mechanical vibration is imparted to the earth typically by a truck having a plate lowerable from its chassis and adapted to be moved back and forth with respect to the earth at predetermined frequencies, so as to impart a mechanical energy to the earth. Most of the trucks used in Vibroseis prospecting have been designed to impart a vertical vibration to the earth so that the output recorded by geophones at the surface of the earth consists of compressional waves. However, apparatus has more recently been developed which imparts a side-to-side vibration to the earth, so that the geophone outputs correspond to shear waves. If both P-waves and S-waves are generated and reflected from common depth points in the earth's sub-surface, it is therefore possible to obtain a measurement of the ratio of their velocities, $V_p/V_s$, and from this to deduce the probable composition of the rock layer through which the waves pass. However, the difference in $V_p/V_s$ with respect to different types of rocks is not very great, and accordingly very accurate measurements of $V_p/V_s$ are necessary before reliable determinations of the sub-surface geology can be made. In particular, it is found that $V_p/V_s$, which can vary between about 1.20 and about 2.50 must be measured with an accuracy above about 0.1 or better, if the results are to be useful. No prior art technique is known which yields results consistently of this accuracy. Therefore, a need exists in the art for an improved method of determining $V_p/V_s$, as a tool for geophysical exploration.

OBJECTS OF THE INVENTION

It is accordingly an object of the invention to provide a method for better determination of the ratio of the velocities of compressional and shear waves in subterranean structures.

Still a further object of the invention is the provision of an improved method of prospecting for valuable minerals.

Still a further object of the invention is the provision of a better model for the determination of the ratio $V_p/V_s$ and one which provides an inherent estimate of the error likely in its result.

Still another object of the invention is to provide an improved technique for providing an average over plural measurements of $V_p/V_s$ in which the more accurate measurements are more heavily weighted.

Other aspects and objects of the invention will appear to those skilled in the art.

SUMMARY OF THE INVENTION

The above objects of the invention and needs of the art are satisfied by the present invention which comprises a method for providing a maximum likelihood estimation of $V_p/V_s$. Plural correlations are performed on seismic records of P-waves, "stretched" by varying ratios, and S-waves from a common source and picked up at a common detector, until the best correlation between the two records is achieved. The ratio by which the P-wave is "stretched" in order to best correlate with the S-wave, is therefore the ratio $V_p/V_s$. A maximum likelihood technique is used to optimize the correlation process and this in turn yields a value for the accuracy of the correlation and hence of the error in the value determined for $V_p/V_s$. The error measurement can in turn be used in weight averaging of a number of $V_p/V_s$ measurements in order to yield a more accurate overall value, and thus to provide a more accurate estimation of the probable composition of the subsurface layer of interest.

BRIEF DESCRIPTION OF THE DRAWINGS

The invention will be better understood if reference is made to the accompanying drawings, in which:

FIG. 5 shows the results of the tests;

FIG. 6a shows actual P-wave data obtained in a field location;

FIG. 6b shows the corresponding S-wave data obtained at the same location;

FIG. 6c shows the results of the corresponding calculation of $V_p/V_s$ in accordance with the invention.

DESCRIPTION OF THE PREFERRED EMBODIMENTS

I. Introduction

Figure 1:
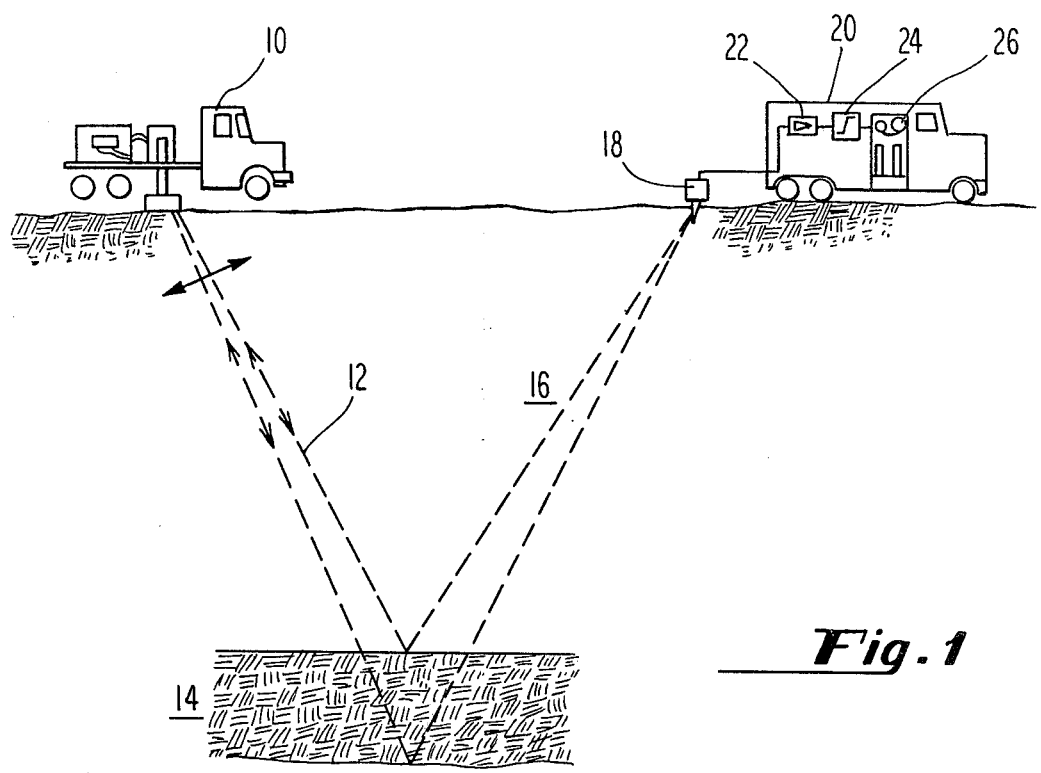
FIG. 1 shows schematically the arrangement used to generate the P- and S-waves respectively and to detect them after travel into the earth and reflection from a subterranean layer.

FIG. 1 shows the general layout of a typical seismic data exploration arrangement. A source of mechanical energy such as a truck 10 fitted with a plate for imparting mechanical energy into the ground is shown on the surface of the earth. Acoustic waves 12 travel downwardly from the location of the truck 10 and are reflected from a subterranean layer of rock 14. To some extent the wave is reflected from both the upper and the lower interfaces of the rock with neighboring layers; hence, the upwardly traveling rays 16 both arrive at the same detector 18, though the wave which traveled to the lower interface naturally is delayed with respect to that at the upper. Both compressional waves (P-waves), indicated by arrows along the direction of the ray path, and shear waves (S-waves), indicated by arrows transverse to the direction of the ray path, are shown being generated by the same truck. In practice this is not usually the case but is shown for clarity. Likewise, in some cases it might be desirable to use different sorts of detectors 18 to pick up the P- and S-waves. In either case, the waves are collected by one or more detectors 18, transmitted to a truck 20, in which the signals may be amplified in amplifier 22, filtered by filters 24, and recorded in recording units 26, all according to well-known conventional techniques. The source 10 and/or the detector 18 of the waves would usually then be moved, and the process repeated to generate additional data.

Figure 2:
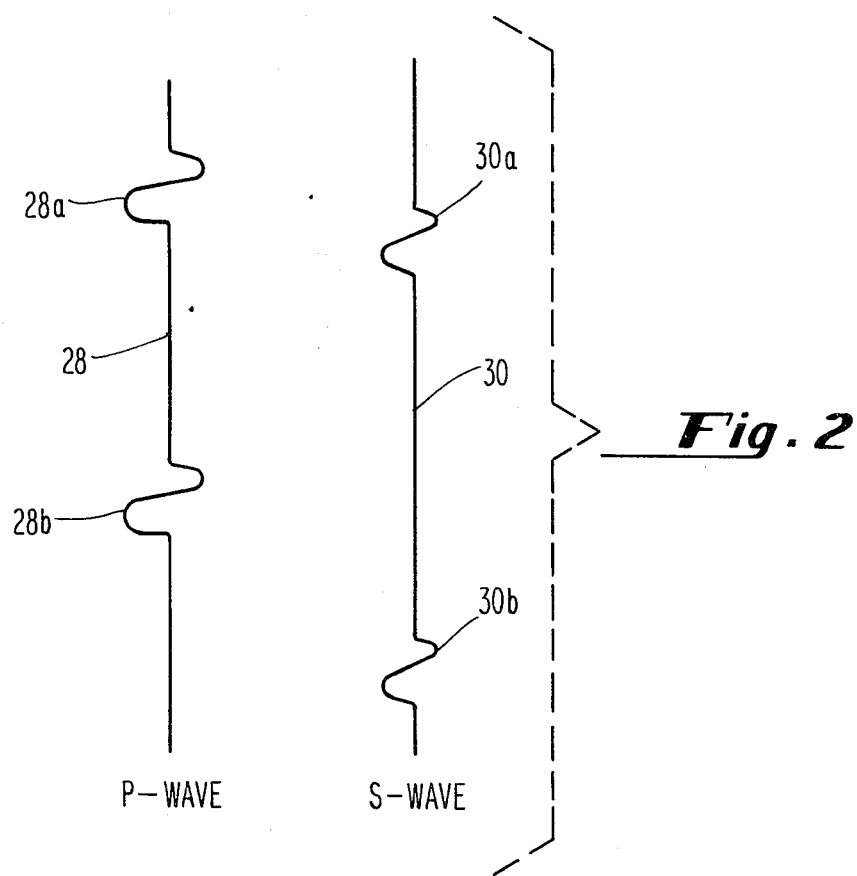
FIG. 2 shows the resultant traces prior to correlation.

As noted above, the velocity $V_p$ of the P-wave is generally considerably higher than the velocity $V_s$ of the S-wave in a given type of rock. Accordingly, outputs of the detector 18 detecting the P-wave and the S-wave are as depicted in FIG. 2. Typical output traces of the detector 18 are shown, the P-wave trace at 28 and the S-wave trace at 30. The traces represent the amplitude of the output (usually voltage) of the detector, versus time, time generally being graphed vertically downward. Both traces comprise generally straight (though noisy) sections during which the detectors put out substantially no output and higher amplitude "wavelets" identified at 28a and 28b for the P-wave trace 28 and 30a and 30b for the S-wave trace 30. With respect to the description of FIG. 1, it will be understood that the first wavelet 28a occurs when the P-wave along the ray path 16 reflected from the upper surface of the rock layer 14 reaches the detector 18, while wavelet 28b is output by the detector 18 upon detection of the wave 16 having been reflected from the lower interface of the rock layer 14. The trace 30 is similar; wavelets 30a and 30b are detected when the S-wave is reflected from the top and bottom surfaces of the rock layer 14, respectively. As shown, the time between wavelets 30a and 30b is greater than that between wavelets 28a and 28b with respect to reflection from the same points on the rock layer 14 due to the slower velocity $V_s$ of the S wave, as compared to the velocity $V_p$ of the P-wave. The ratio $V_p/V_s$ is thus inversely proportional to the ratio of the times between the corresponding wavelets on the two traces.

As noted above, the ratio $V_p/V_s$ of compressional (P-wave) velocity to shear wave (S-wave) velocity is a potentially useful interpretative tool. Two complementary reasons for increased interest in $V_p/V_s$ are the added geological information this parameter carries, and the growing capability to gather S-wave seismic data. The $V_p/V_s$ ratio seems to be an excellent vehicle for quantifying the added information which S-wave data brings.

1.1 Determination of $V_p/V_s$ from P-Wave and S-Wave Seismograms

One reason for the attractiveness of $V_p/V_s$ is its relative accessibility, given both P- and S-wave seismograms over a common line. A straight forward estimation scheme begins by identifying a common sedimentary interval on P- and S-wave seismic sections. The respective P-wave and S-wave travel times $t_p$ and $t_s$ are then measured between the peaks (or onsets) of the reflectors delineating the interval. Under the assumption that the P-wave and S-wave velocities are constant within the interval, the $V_p/V_s$ ratio is then $$V_p/V_s = (1/t_p)/(1/t_s) = t_s/t_p \tag{1.1}$$

Thus, determination of $V_p/V_s$ is as simple as measuring the relative times $t_p$ and $t_s$ between the wavelets 28a and 28b and between 30a and 30b, respectively (FIG. 2). However, as suggested above, the maximum error permissible in a typically useful estimation of $V_p/V_s$ is 0.1. In order to achieve this goal, $t_s$ and $t_p$ must be measured accurately to within ±2.5%. Adequate determination of $V_p/V_s$ in an interval 100 ms deep (P-wave section) thus requires that the time between boundary reflectors be "picked" to within ±2.5 ms, an extremely difficult task.

1.2 Overview

Up to this point, it has been argued that the $V_p/V_s$ ratio is potentially a very useful quantity, but one which is difficult to estimate to sufficient accuracy, based on straightforward use of Eq. 1.1. One is thus led to the subject of this invention: methods which make the most efficient use of the information in P- and S-wave seismograms for the determination of $V_p/V_s$.

Broadly stated, the invention utilizes the difference between correlating points on two different traces (the S- and the P-traces) and correlating intervals. The direct method described above is based on matching a single point, say the peak, on each P-wave wavelet with a corresponding point on each S-wave wavelet; that is, each pair of points is intended to represent the same physical location in the subsurface. Error is introduced into the $V_p/V_s$ calculation when a pair of these chosen points do not, in fact, match the same subsurface point. One might correct for some of this error by checking another pair of points, chosen to represent another location in the interval of interest, and adjusting $V_p/V_s$ for any apparent mismatch. This process might be repeated over and over again until the best correlation is achieved between all the points in the subinterval of interest. One is thus led to expect that full utilization of all the information in the S- and P-wave seismograms must involve a matching of all the points on the two traces with respect to each subterranean layer for which $V_p/V_s$ is to be determined. This invention is of a method which yields such a matching technique.

The methods used here are developed from maximum likelihood theory using a simple model of the relationship between the P-wave and S-wave seismograms. The model used here to relate $V_p/V_s$ to the P-wave and S-wave data is described below in Section 2, "Statistical Model". Next, the maximum likelihood method and its properties are briefly reviewed in Section 3.

Thereafter, in a Section 4, "Application of Maximum Likelihood Theory to $V_p/V_s$ Ratio Estimation", the maximum likelihood estimator for $V_p/V_s$ is derived and shown to be equivalent to maximizing the correlation between S-wave and P-wave seismograms. The Cramer-Rao lower bound is then applied to produce a data-dependant expression for the rms error in the $V_p/V_s$ estimate for a given pair of S-wave and P-wave traces. The resulting error expression describes the information present in each trace pair. The information measure is shown to provide optimal weighting when multi-trace $V_p/V_s$ averages are desired. An expression for the rms error in such a multi-trace average is also given.

Finally, model studies, carried out to check the performance of the maximum likelihood estimator and its error measure, are described, and an example with real seismograms are presented, both in Section 5.

2. Statistical Model

The method of maximum likelihood estimation requires a model relating the parameter to be determined to the observable data. For $V_p/V_s$ ratio estimation, the $V_p/V_s$ ratio as a function of two-way travel time is, of course, the main parameter of interest. It turns out that even a simplified model for $V_p/V_s$ estimation also requires the introduction of certain other parameters.

The $V_p/V_s$ ratio estimation problems at different intervals (i.e., with respect to differing subterranean layers of interest) will be considered to be decoupled, and $V_p/V_s$ within each interval will be assumed constant. For a fixed depth interval, and with respect to a fixed CDP point the functions P(t) and S(t) will be used to denote the corresponding (segments of the) P-wave and S-wave seismograms, respectively. Consideration of the travel time differences between the P-wave and S-wave seismograms indicates that S(t) is related to P(t) by a stretching of the time axis; that is, $V_p > V_s$. A first order model is thus:

$$S(t) = P(t/\mu) \tag{2.1}$$

where the stretch parameter $\mu$ is the $V_p/V_s$ ratio. This is, in fact, the model which was implicitly used in the intuitive $V_p/V_s$ estimation procedure discussed above. A more complete model must allow for the fact that both seismograms contain noise and differ in absolute gain. The model which will be used herein is:

$$S(t) = aP(t/\mu) + n(t) \tag{2.2}$$

where:
- $\mu$ = interval $V_p/V_s$ ratio
- a = relative gain
- n(t) = additive random noise Using Eq. 2.2, it is possible to formulate a parametric model for the probability distribution of the data. It will be assumed that n(t) is Gaussian, and sufficiently broadband to be considered white. For simplicity t will be considered to be a discrete variable, taking on values $t = 1, 2, \ldots, n$. More sophisticated (but not more meaningful) formulations are possible with t a continuous variable. The relevant probability density, which is the conditional density of S given P, may now be expressed as $$f(S|P; \mu, a, \sigma) = \frac{1}{\sigma^n (2\pi)^{n/2}} \exp - \left\{ \frac{1}{2\sigma^2} \sum_t [S(t) - aP(t/\mu)]^2 \right\} \tag{2.3}$$

The parameter $\sigma^2$ has been introduced in Eq. 2.3 to represent the unknown variance of n(t).

Equation 2.3 presents what is, in statistical parlance, a parametric model. For given data S(t) and P(t), a likelihood function may be defined from Eq. 2.3 via $$L(\mu, a, \sigma) = f(S|P; \mu, a, \sigma) \tag{2.4}$$

Equations 2.3 and 2.4 provide a point of departure for the development of an estimator for $\mu$.

3. The Maximum Likelihood Estimation Method

Figure 3:
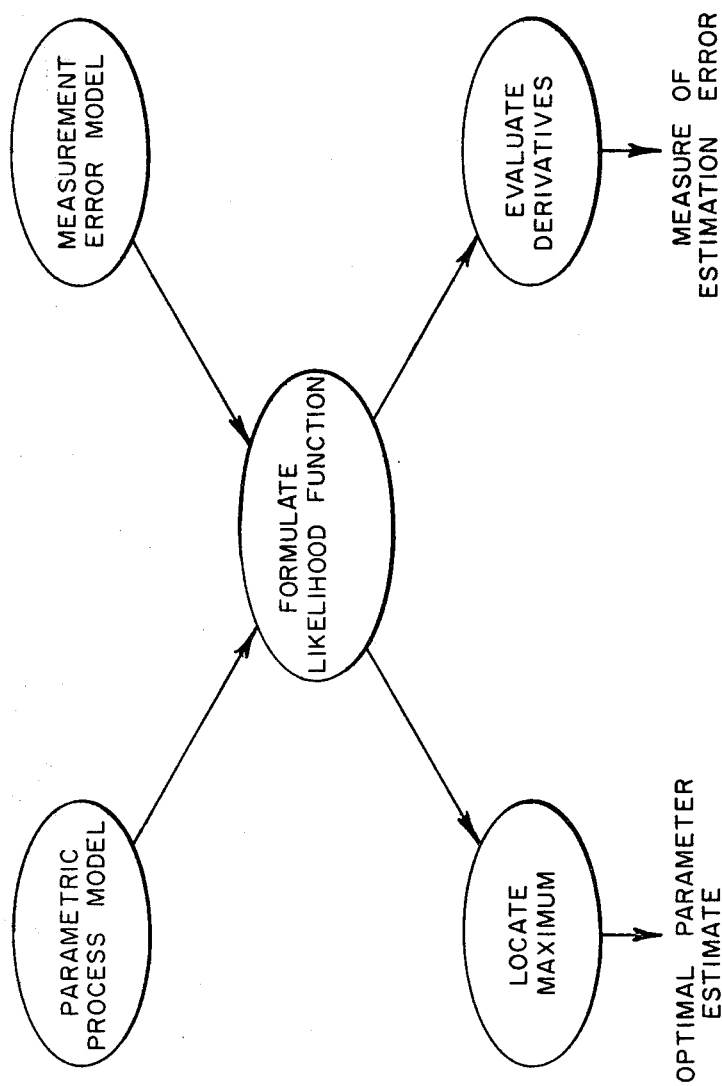
FIG. 3 shows how the formation of the likelihood function interconnects the modeling of the data, the measurement of the actual error between the model and the real data, the production of an estimated optimal parameter and the providing of a measurement of the estimation error.

The concepts involved in the maximum likelihood estimation technique are illustrated in FIG. 3. A likelihood function, such as the one displayed in Eq. 2.4, provides the connection between a physical model for the data and mathematical analysis leading to formulas for estimation. This section provides a brief overview of the maximum likelihood technique, of which the analysis of Section 4 may be viewed as a special case.

Suppose that $f(X_n; \theta)$ is the joint probability density function (e.g. Eq. 2.3) of n random variables $x_1, \ldots, x_n$ arranged in the vector $$X_n = (X_1, \ldots, X_n)^T$$

The vector $$\theta = (\theta_1, \ldots, \theta_m)^T$$

contains the parameters which are to be estimated by observing data $X_n = x_n$. The likelihood function (e.g. 2.4) is defined as $$L(\theta) = f(X_n = x_n; \theta)$$

for a fixed, observed data vector $x_n$. The maximum likelihood estimate $\hat{\theta}(n)$, based on observing a data vector of length n, is the value of $\theta$ which maximizes $L(\theta)$.

The properties of $\hat{\theta}(n)$ are the source of most of the method's appeal. Among other things, $\hat{\theta}(n)$ is consistent, asymptotically efficient, and asymptotically Gaussian, in the technical sense of these words. Here consistent means that $$\hat{\theta}(n) \to \theta^* \tag{3.1}$$
$$n \to \infty$$

where $\theta^*$ is the true value of $\theta$ and the convergence is in probability. The estimate $\hat{\theta}(n)$ is asymptotically efficient in that the variance of the estimation error $$V(n) = E\{(\hat{\theta}(n) - \theta^*)(\hat{\theta}(n) - \theta^*)^T\} \quad (3.2)$$

converges to the Rao-Cramer lower bound, $1^{-1}(n)$ in the sense that $$\lim_{n \to \infty} \{V(n) - 1^{-1}(n)\} = 0 \quad (3.3)$$

where $$l(n) = E\left\{\left(\frac{\partial \ln L}{\partial \theta}\right)\left(\frac{\partial \ln L}{\partial \theta}\right)^T\right\}_{\theta = \theta^*} \quad (3.4)$$

The Rao-Cramer bound is the theoretical lower limit for the estimation error variance any unbiased estimator can produce for a given problem. The quantity $l(n)$ has been called information, partly because of this limiting property, and partly because information defined this way is additive.

Finally, in the limit as n becomes large the probability distribution function of the estimation error $$e(n) = \hat{\theta}(n) - \theta^*$$

is Gaussian, with mean zero and variance given by Eq. 3.4. For the case where n is large, the maximum likelihood estimator is not only the best estimator, but the distribution of its estimation errors is fully characterized.

The Gaussian nature of the maximum likelihood estimation errors is of much more than theoretical interest. Given only an expression for the covariance matrix of this distribution one can use this property to establish confidence intervals for $\theta^*$ from an estimate $\hat{\theta}$. The calculation of the covariance of $e(n)$ via Eq. 3.4, because it involves derivatives of the logarithm of the likelihood function, is a natural part of the maximum likelihood estimation process. In practice, one makes use of the consistency property, Eq. 3.1, to justify evaluating Eq. 3.4 at $\hat{\theta}(n)$, which is known, rather than at $\theta^*$, which is not. The mechanics of this process are demonstrated in the next section.

4. Application of Maximum Likelihood Theory to $V_pV_s$ Ratio Estimation

4.1 Estimation of $V_p/V_s$

The maximum likelihood estimator for $V_p/V_s$ is obtained by maximizing the likelihood function described by Eqs. 2.3 and 2.4 as a function of the parameters $\mu$, $a$, and $\sigma$. Equivalently, one may maximize the logarithm of the likelihood function $$LL(\nu, a, \sigma) = -n \log \sigma - \frac{1}{2\sigma^2} \sum_t [s(t) - aP(t/\mu)]^2 \quad (4.1)$$
$$+ \text{constant}$$

Maximizing first with respect to $\sigma$, one obtains (by the ordinary method of solving for a stationary point)

$$\hat{\sigma}^2 = \frac{1}{n} \sum_t [S(t) - aP(t/\mu)]^2 \quad (4.2)$$

$$= \hat{\sigma}^2(a, \mu)$$

The problem is now equivalent to maximizing $$LL^{(1)}(a, \mu) = \max_\sigma LL(a, \mu, \sigma) \quad (4.3)$$

$$= LL(a, \mu, \hat{\sigma}(a, \mu))$$

$$= -\frac{n}{2} \log \left\{ \sum_t [S(t) - aP(t/\mu)]^2 \right\}$$

$$+ \text{constant}$$

Using similar techniques to maximize Eq. 4.3 with respect to a, one obtains $$\hat{a}(\mu) = \frac{<S(t), P(t/\mu)>}{\| P(t/\mu) \|^2} \quad (4.4)$$

and $$LL^{(2)}(\mu) = \max_{a, \sigma} LL(a, \mu, \sigma) \quad (4.5)$$

$$= LL^{(1)}(\hat{a}(\mu), \mu)$$

$$= -\frac{n}{2} \log \left\{ \| S(t) \|^2 - \frac{<S(t), P(t/\mu)>^2}{\| P(t/\mu) \|^2} \right\}$$

where the notation is $$<S(t), P(t/\mu)> = \sum_t S(t) P(t/\mu) \quad (4.6)$$

$$\| S(t) \|^2 = <S(t), S(t)> = \sum_t S^2(t)$$

The numerical value of $\mu$ which maximizes $LL^{(2)}(\mu)$ is the maximum likelihood estimate $\hat{\mu}$. Because the logarithm is a monotonic function and $\| S(t) \|^2$ is independent of $\mu$, it follows from Eq. 4.5 that $\hat{\mu}$ is obtained by solving $$\max_\mu \frac{<S(t), P(t/\mu)>^2}{\| P(t/\mu) \|^2} \quad (4.7)$$

The optimal estimate for $V_p/V_s$ is thus found by maximizing the simple correlation between the S-wave and stretched P-wave seismograms, weighted by the inverse of the energy in the stretched P-wave seismogram.

4.2 Calculation of Estimation Error Variance and Information

The expression used here for the information about $\mu$ contained in the data is $$I_\mu(n) = -\frac{\partial^2 LL^{(2)}}{\partial^2 \mu^2} \quad (4.8)$$

where $LL^{(2)}(\mu)$ is defined by Eq. 4.5. The required derivative is given by $$\frac{\partial^2 LL^{(2)}}{\partial \mu^2} = \frac{n\left[\frac{3}{4\mu^2} <S(t), P(t/\mu)>^2 - \frac{1}{\mu^4} <S(t), P(t/\mu)> <S(t), P'(t/\mu)t^2>\right]}{\|S(t)\|^2 \cdot \|P(t/\mu)\|^2 - <S(t), P(t/\mu)>^2} \quad (4.9)$$

where, in calculating derivatives, the simplifying approximation $$\|P(t/\mu)\|^2 = \frac{\mu}{\hat{\mu}} \|P(t/\hat{\mu})\|^2$$

has been used. This approximation is exact in the limit as the time sampling interval becomes small.

The estimation error variance may be found from $$E\{(\hat{\mu} - \mu^*)^2\} = l_\mu^{-1}(n) \quad (4.10)$$

The simple Eq. 4.8 differs from the general Eq. 3.4 in three ways:

(a) Use has been made of the general identity $$E\left\{\frac{\partial LL}{\partial \theta} \frac{\partial LL^T}{\partial \theta}\right\} = -E\left\{\frac{\partial^2 LL}{\partial \theta^2}\right\}; \quad (4.11)$$

(b) A large sample approximation $$E\left\{\frac{\partial^2 LL}{\partial \theta^2}\right\} \approx \frac{\partial^2 LL}{\partial \theta^2} \quad (4.12)$$

has been made and (c) The implicit function theorem has been applied to show $$\left[\frac{\partial^2 LL}{\partial \theta^2}\right]^{-1}_{11} = \left(\frac{\partial^2 LL^{(2)}}{\partial \mu^2}\right)^{-1} \quad (4.13)$$

This last identity 4.13 needs explanation.

According to Eqs. 3.4 and 4.11, the Fisher information contained in the data is the 3×3 matrix $$-E\left\{\frac{\partial^2 LL}{\partial \theta^2}\right\}$$

This is the joint information about the vector $\theta = (\mu, \lambda, \sigma)^T$. The estimation error variance associated with $\mu$ is therefore the (1,1) element of the inverse matrix $$E\{(\mu - \mu^*)^2\} = -\left[E\left\{\frac{\alpha^2 LL}{\alpha \theta^2}\right\}^{-1}\right]_{1,1} \quad (4.14)$$

The information about $\mu$ alone, or marginal information about $\mu$, is defined as $$l_\mu(n) = 1/E\{(\hat{\mu} - \mu^*)^2\} \quad (4.15)$$

Equations 4.14 and 4.15 define $l_\mu$ as the scalar inverse of a particular element of the inverse Fisher information matrix, not a very elegant expression. The identity given by Eq. 4.13 makes it possible to transform the information formula into the simple scalar derivative in Eq. 4.8.

4.3 Multi-Trace $V_p/V_s$ Ratio Averages

It is often desirable to compute average $V_p/V_s$ estimates across several adjacent traces. This is indicated, for instance, when the single trace estimation error variance, given by Eq. 4.10, is too large. Intuitively, the statistical error in an average $V_p/V_s$ estimate decreases as the number of values averages increases.

In this section the maximum likelihood estimator is examined when the data are a group of P-wave and S-wave trace segments, assumed to have the same underlying $V_p/V_s$. It is shown that asymptotically, for large sample, the optimal weights are the marginal single-trace informations, obtained from Eq. 4.10. Consequently, the multitrace $V_p/V_s$ information is obtained simply by summing the single trace marginal information. This makes available a simple formula for the estimation error variance associated with the average.

Suppose that data are available from a group of seismogram segments, matched in S-wave and P-wave pairs $$[S_j(t), P_j(t)], j \in J$$

The noise processes for different trace pairs $$n_j(t), n_k(t); j \neq k$$

are assumed independent, and the parameters $(a_j, \sigma_j)$, $j \in j$ may vary from pair to pair. The underlying $V_p/V_s$ ratio, $\mu$, associated with these data is assumed constant.

Under the assumptions just outlined, the joint likelihood function is the sum $$LL(\mu, a_j, \sigma_j, j \in J) = \sum_{j \in J} LL_j(\mu, a_j, \sigma_j) \quad (4.16)$$

where $LL_j$ is defined by Eq. 2.4. By applying the techniques of Section 4.1, the joint maximization of the log-likelihood can be reduced to maximization of a function of $\mu$ only $$LL^{(2)}(\mu) = \sum_{j \in J} LL_j^{(2)}(\mu) \quad (4.17)$$

where $LL_j^{(2)}$ is defined by Eq. 4.5.

By combining the large sample properties of the single trace estimate, $\hat{\mu}_j$, the expression $$LL_j^{(2)}(\mu) = (\mu - \hat{\mu}_j)^2 l_{\mu,j}(n) \quad (4.18)$$

can be obtained. Equations 4.17 and 4.18 define the asymptotic log-likelihood function for all the data $$LL^{(2)}(\mu) = \sum_v (\mu - \hat{\mu}_j)^2 l_{\mu,j}(n) \quad (4.19)$$

The maximum likelihood estimate for $\mu$ is now easily seen to be $$\hat{\mu} = \frac{\sum_i l_j \hat{\mu}_j}{\sum_j l_j} \quad (4.20)$$

while the multitrace information is $$l = \sum_j l_j \quad (4.21)$$

At least asymptotically, Eqs. 4.20 and 4.21 define the optimal multitrace estimate and its estimation error, respectively.

5. Test Results

5.1 Model Studies

Figure 4:
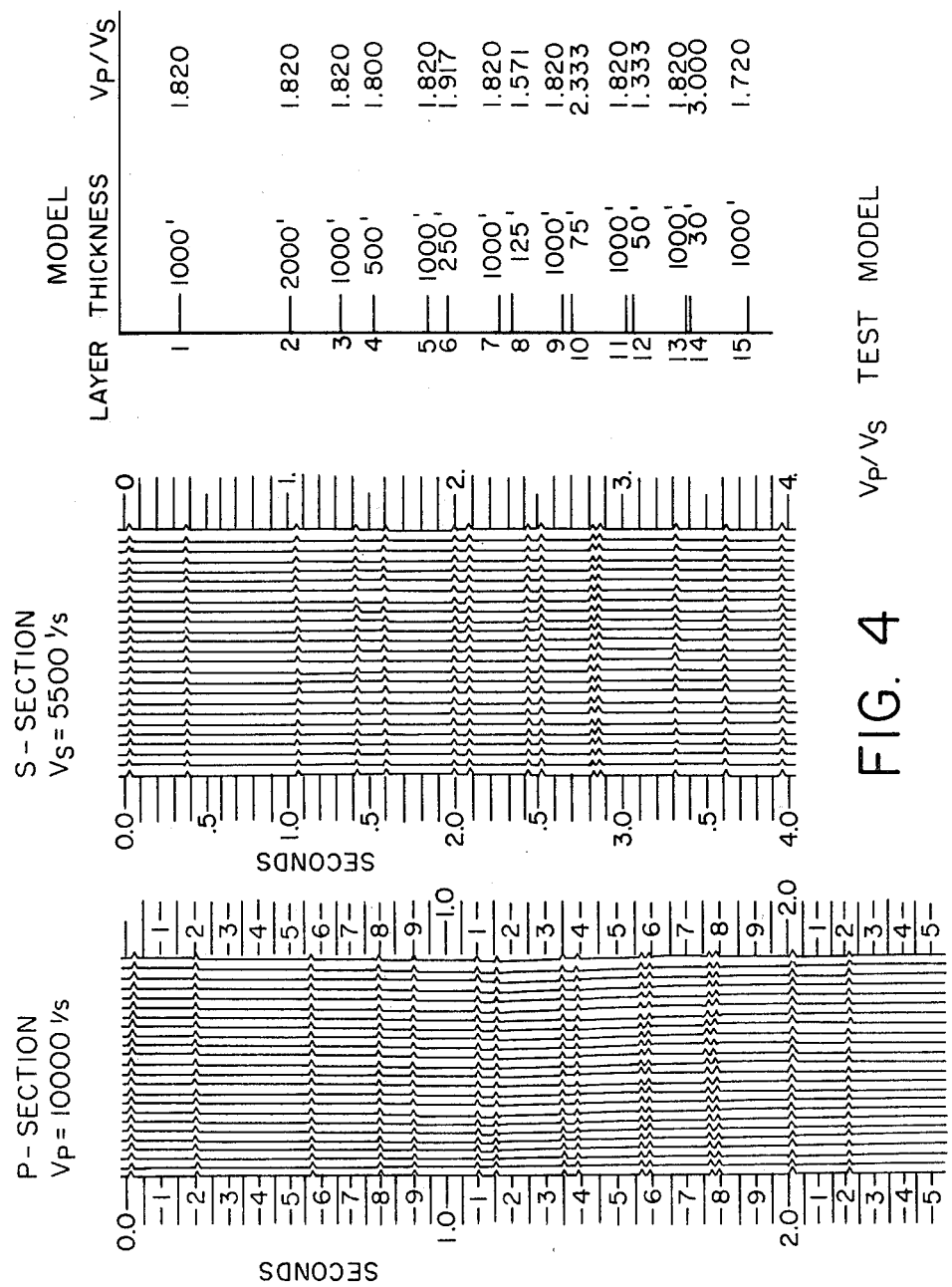
FIG. 4 shows a model seismogram used to test the method of the invention.

To test the method of the invention, a simple model was designed that consisted of layers of varying thickness separated by layers 1000 feet thick (FIG. 4). A P-wave velocity of 10,000'/sec and an S-wave velocity of 5500'/sec were assigned to each layer. Because the modeling program rounds two-way travel time from reflectors to the nearest sample, different values of $V_p/V_s$ result for different layers. These values are shown in FIG. 4. Zero-phase wavelets were convoluted with the P-wave and S-wave reflectivities, respectively, to obtain the synthetic seismogram sections also shown in FIG. 4. Six test intervals were chosen as listed below:

| Interval | Times on P-wave Section | Times on S-wave Section |
|---|---|---|
| 1. | .450–.850 | .900–1.550 |
| 2. | .700–1.000 | 1.200–1.800 |
| 3. | .850–1.125 | 1.550–2.050 |
| 4. | 1.000–1.250 | 1.850–2.250 |
| 5. | 1.250–1.500 | 2.250–2.700 |
| 6. | 1.500–1.700 | 2.700–3.100 |

The first test was run with no additive noise to test the accuracy of the $V_p/V_s$ estimates, and the information content estimate. FIG. 5 illustrates the process and shows results for the six intervals. The trace labelled "S-TRACE" is the original S-interval plotted at twice the time scale of "P-TRACE" (i.e., 0.400 seconds indicated on the time axis is P-time, S-time would be 0.800). The trace labelled "S-STRETCH" is the S-wave trace that maximized the likelihood function and provides the optimum estimate of $V_p/V_s$. That is, the trace which most closely matched the P-trace when compared according to the weighting technique of the invention; the "Estimated $V_p/V_s$ Ratio" is thus the stretch rate which when applied to the S-trace yielded the best match. The actual $V_p/V_s$, the optimal estimate of $V_p/V_s$, the information content and the corresponding standard deviation are listed for each of the six intervals. As the formulation predicts, the estimated values of $V_p/V_s$ are consistent with the estimated variances and the information content increases as the interval of time with useful information increases. The comparative difference in information content and in standard deviation between intervals 2 and 4 and 1 and 3 results from the analog-to-digital conversion used to stretch the S-trace; where the sampling interval does not coincide well with the stretch ratio under test, the match is accordingly less precise. By comparison, the drop off in information content is samples 5 and even more so in sample 6 is due to the overlap of the maximum amplitude portions of the traces, from which most of the information used in the correlation calculations is derived. As noted above in the discussion of Eq. 4.7, the estimate is weighted by the inverse of the energy in the P-wave seismogram. Furthermore, of course, as the sample of the trace sought to be correlated extends past the location of the maximum amplitude portions, the trace may not entirely relate to a wave in a single layer of rock, i.e., the assumption that $V_p/V_s$ is constant over the interval of interest may no longer be valid.

5.2 An Example With Real Seismograms

The example chosen to illustrate usage of the maximum likelihood $V_p/V_s$ estimation technique of the invention was an exploration line at which coincident P-wave and S-wave seismograms were available. The primary objective was to observe relative response to P-wave and S-wave energy due to a small gas accumulation trapped by a pinchout in an Upper Cretaceous sand below about 6,400 feet of poorly consolidated younger sediments.

FIG. 6a shows the actual P-wave seismograms corresponding to the part of the line used as a modeling window, while FIG. 6b shows the corresponding S-wave seismograms and FIG. 6c displays the $V_p/V_s$ profile calculated by the maximum likelihood estimation technique of the invention. Those skilled in the art will recognize FIGS. 6a and b as records of the outputs of geophones responsive to acoustic waves in the earth; each vertical record or "trace" is the output of one or more geophones summed in accordance with their relative position. The vertical axis is time, while the horizontal axis is distance along a line of exploration. If the wave velocity is substantially constant, FIGS. 6a and b represent cross-sections of the earth; the heavier portions of the traces represent interfaces between rock layers. FIG. 6a (the P-wave) has been expanded vertically with respect to FIG. 6a in accordance with $V_p/V_s$, so as to match the scale. However, visual comparison of FIG. 6c with FIG. 6b will reveal the difficulty of exactly correlating any single point on any of the traces of FIG. 6a with the corresponding point on the traces of FIG. 6b—the difficulty overcome by the method of the present invention. FIG. 6c is a representation of $V_p/V_s$ showing its variance along the horizontal extent of the survey; the central line represents $V_p/V_s$, and is flanked on either side by lines representing the uncertainty in $V_p/V_s$ to one standard deviation. A gas induced anomaly in $V_p/V_s$ centered at shotpoint (SP) 100 is obvious. Note, however, that $V_p/V_s$ anomalies must not be accepted uncritically. The positive anomaly centered near SP 75 is an artifact caused by deterioration of the (already poor) S-wave data in the corresponding shotpoint range. The experience of the inventors shows that anomalies indicating the presence of gas in stratigraphic traps are sometimes detectable even where the S-wave data is poor. Another point illustrated in this example is that valuable results may be obtained from the method of the invention for arbitrary windows, bounded by constant times, rather than by comparing strictly correlative stratigraphic intervals bounded by identifiable seismic events. That is, evidence of anomalies may be valuable even when it cannot be assumed that $V_p/V_s$ is constant. This does not imply that meaningful $V_p/V_s$ data can be obtained without careful study of the section in control wells. In the example shown in FIG. 6, several generations of increasingly detailed models were run before obtaining an adequate match to previously known seismic data.

Figure 7:
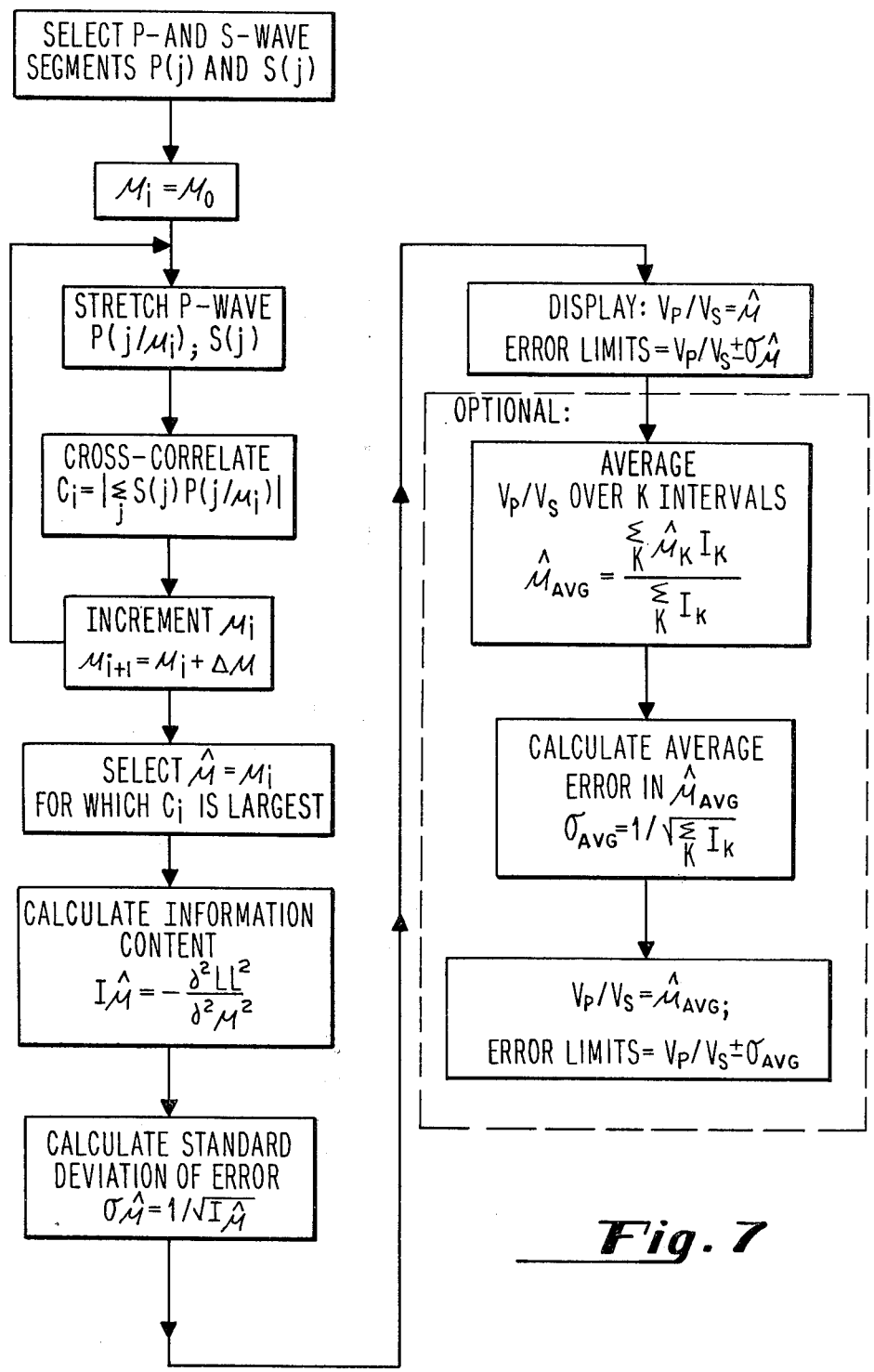
FIG. 7 is a flowchart of the method of the invention.

FIG. 7 is a flowchart showing the outline of the process of the invention. The method is begun by a selection of segments of P- and S-wave records designed to correspond to a geological interval. This yields samples P(j) and S(j). $\mu_i$, the stretch factor is set equal to $\mu_O$, an initial value. After stretching of the P-wave sample by division by $\mu_i$, cross correlation between samples S(j) and P(j)/($\mu_i$) is performed. $\mu_i$ is then incremented by $\Delta \mu$ and the process repeated. After $\mu_i$ has been incremented throughout the likely interval of possible $V_p/V_s$ ratios, $\hat{\mu}$ is chosen, this being that $\mu_i$ for which the correlation was maximized. The information content $I_{\hat{\mu}}$ is then calculated by taking the partial second derivative of the likelihood function LL defined above, with respect to $\mu$. One can then calculate the standard deviation of the error $$\sigma \hat{\mu} = 1/\sqrt{I_{\hat{\mu}}}$$

$\hat{\mu}$ is equal to $(V_p/V_s)$ and $\sigma_{\hat{\mu}}$ indicates the error in this measurement, i.e., is the standard deviation of the error. One can then continue by performing the process again for k different intervals of P- and S-wave segments, thus allowing for the possibility that the segments did not precisely correspond to the subterranean interval of interest, and a weighted average value for $\hat{\mu}$ calculated:

$$\hat{\mu}_{avg} = \sum_k \hat{\mu}_k I_k / \sum_k I_k$$

Similarly, the average standard deviation $$\sigma_{avg} = 1/\sqrt{\sum_k I_k}$$

It will be appreciated by those skilled in the art that there has been described a method for the application of statistical modeling and maximum likelihood estimation techniques to the determination of the $V_p/V_s$ ratio. All of the results presented here are predicated on the simple model that $V_p/V_s$ is the "stretch" factor that relates P-wave and S-wave seismograms at the same CDP point. Maximum likelihood estimation theory is applied to produce the optimal $V_p/V_s$ estimator, and a data-dependent expression for the standard deviation of the estimation error. In effect, the latter expression describes the information about $V_p/V_s$ which is contained in the data. The standard deviation of the estimation error indicates the probable error between the true $V_p/V_s$ ratio of a formation and the maximum likelihood estimate of this ratio. In addition, these results are used to find the optimal weights for averaging $V_p/V_s$ across several adjacent traces, and for describing the estimation error in the optimal average. Such averaging, when geologically justified, significantly reduces the error in estimating $V_p/V_s$.

The performance of the maximum likelihood estimator has been demonstrated on both model and real data. Model data experiments with various synthetic noise levels demonstrate that the maximum likelihood estimator performs quite well in recovering the model $V_p/V_s$ ratio. Actual estimation errors with model data are also in reasonable agreement with the accompanying maximum likelihood estimation error formula. Examples presented above illustrate the use of the maximum likelihood method with real data.

The results obtained here are, of course, dependent upon statistical modeling, while the adjective "optimal" when applied to the estimators derived here is relative to the model presented in Section 2. The maximum correlation $V_p/V_s$ estimation given by Eq. 4.7, however, does seem to be optimal for other models, leading one to suspect that this is a very robust estimator. For example, if the model is simplified by removing the assumptions of unknown relative seismogram gain and/or unknown signal-to-noise ratio, the resulting maximum likelihood estimator is still given by Eq. 4.7. The same is true if the model is complicated by adding the possibility of a relative shift between the P-wave and the S-wave seismogram segments.

Accordingly, it will be appreciated by those skilled in the art that the maximum likelihood estimation technique of the invention is a powerful tool for evaluation of the ratio of compressional to shear wave velocities in subterranean rock formations.

It will likewise be appreciated by those skilled in the art that there are numerous modifications and refinements which can be made to the method of the invention without departing from its essential spirit and scope. For example, while the ratio $V_p/V_s$, the "stretch ratio", is varied stepwise in the method to determine the point of maximal correlation between stretched individual P-wave and corresponding S-wave traces, it would be possible to use an iterative technique in which $V_p/V_s$ were varied by smaller and smaller intervals as the correlation got progressively better and better. The choice would usually be made on the basis of the specific implementation chosen. It will also be recognized that in addition to variation of the stretch ratio, variations in the starting points of the segments of the records to be correlated will affect the correlation. Solutions to this problem, which would arise regardless of the "stretching" performed according to the invention, are within the scope of prior art correlation techniques. Other modifications will no doubt appear to those skilled in the art. Therefore, the above description of the invention should be considered exemplary only and not as a limitation on its scope, which is more properly defined by the following claims.

We claim:

1. A method of seismic exploration by determining the ratio of the velocities of compressional and shear waves in subterranean formations comprising the steps of:
    recording the output of one or more detectors of seismic energy with respect to both compressional and shear waves emitted from a single source and reflected from similar points defining an interval of interest in the earth's subterranean scructure as a function of time;
    stretching the record of the compressional wave with respect to time by a predetermined stretch ratio;
    measuring the correlation of wave shape between the stretched record of the compressional wave and the record of the shear wave;
    recording the accuracy of the correlation;
    modifying the stretch ratio;
    re-performing said steps of stretching, correlating and recording;

repeating said steps of changing the stretch ratio, stretching, correlating and recording; and selecting that stretch ratio which maximizes the correlation between the stretched compressional wave and the unstretched shear wave as the ratio of the velocities of compressional waves and shear waves in said interval of interest.

2. The method of claim 1 further including the step of selecting the standard deviation as a measure of the error in the selected stretch ratio.

3. The method of claim 2 wherein said method is performed a plurality of times with respect to a plurality of intervals of interest defining a rock layer common to all said measurements, and the resulting plurality of individual values for the ratio of the velocity of the compressional wave to that of the shear wave are combined and averaged to yield a still more accurate estimate of said ratio, wherein the individual values for said ratio are each weighted in said averaging step by an amount inversely proportional to the square of the standard deviation calculated for each value.

4. The method of claim 1 wherein the interval of interest with respect to which said compressional wave record and said shear wave record are correlated is chosen such that the end points of said interval are substantially coincident with relatively high signal amplitude portions of said records, whereby the interval of interest corresponds to a relatively well-defined subterranean structure.

5. The method of claim 1 comprising the additional step of varying the endpoints on one of said records prior to said measuring step to adjust the relative portions of said records sought to be correlated.

6. A method of seismic exploration by determining the ratio of the velocities of compressional and shear waves in subterranean layers, comprising the steps of:

causing a compressional wave to be transmitted generally downwardly into the earth from a source point for reflection from points on interfaces between said layers and other layers to return generally upwardly;

detecting return of said compressional wave to the surface of the earth with a detector producing a signal;

causing a shear wave to be transmitted generally downwardly into the earth from said source point for reflection from said points on interfaces between said layers and said other layers to return generally upwardly;

detecting return of said shear wave to the surface of the earth with a detector producing a signal;

recording said signals as functions of time;

stretching said signal recorded corresponding to said compressional wave with respect to time by a predetermined factor;

comparing said stretched signal with the signal recorded corresponding to said shear wave;

recording the results of said comparison step;

varying said predetermined factor;

repeating said steps of stretching, comparing and recording; and selecting that one of said factors which yielded the maximum result of said comparison step as the ratio of the velocities of compressional and shear waves in said subterranean layers.

7. The method of claim 6 wherein a plurality of such selecting steps are performed each on differing corresponding signals recorded with respect to compressional and shear waves, and the resultant ratios of velocities are averaged to yield a more accurate value for said ratio, wherein individual ratios are weighted in said averaging in proportion to the relative value of the recorded result of the corresponding comparison step.

8. The method of claim 6 wherein compressional wave and shear wave records are obtained using different sources and detectors of seismic energy, with respect to said compressional and shear waves.

9. The method of claim 6 wherein said method is performed a plurality of times with respect to a plurality of intervals defining a rock layer common to all said measurements, and the resulting plurality of individual values for the ratio of the velocity of the compressional wave to that of the shear wave are averaged to yield a still more accurate estimate of said ratio, wherein the individual values for said ratio are each weighted in said averaging step by an amount inversely proportional to their error.

10. The method of claim 6 further comprising the step of varying the endpoints of at least one of said records prior to said comparing step.

* * * * *